(12) United States Patent
Gao (10) Patent No.: US 9,414,385 B2
(45) Date of Patent: Aug. 9, 2016

(54) DATA PROCESSING METHOD, DEVICE AND COMPUTER STORAGE MEDIUM

(71) Applicant: ZTE Corporation, Shenzhen, Guangdong (CN)

(72) Inventor: Jingbo Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/370,012

(22) PCT Filed: Apr. 2, 2014

(86) PCT No.: PCT/CN2014/074675
§ 371 (c)(1),
(2) Date: Dec. 6, 2014

(87) PCT Pub. No.: WO2014/161494
PCT Pub. Date: Oct. 9, 2014

(65) Prior Publication Data
US 2015/0271823 A1 Sep. 24, 2015

(30) Foreign Application Priority Data
Sep. 25, 2013 (CN) .......................... 2013 1 0442885

(51) Int. Cl.
*H04W 4/00* (2009.01)
*H04W 72/04* (2009.01)
*H04L 29/06* (2006.01)
*H04W 76/02* (2009.01)
(Continued)

(52) U.S. Cl.
CPC ......... *H04W 72/0453* (2013.01); *H04L 67/104* (2013.01); *H04L 69/14* (2013.01); *H04W 76/023* (2013.01); *H04W 84/12* (2013.01)

(58) Field of Classification Search
CPC .................................................. H04W 76/023
See application file for complete search history.

(56) References Cited

U.S. PATENT DOCUMENTS

| 2011/0082940 A1 | 4/2011 | Montemurro |
| 2012/0106475 A1* | 5/2012 | Jung ................... H04W 72/121 370/329 |

(Continued)

FOREIGN PATENT DOCUMENTS

| CN | 102790963 A | 11/2012 |
| CN | 103200567 A | 7/2013 |

(Continued)

OTHER PUBLICATIONS

Wi-Fi Peer-to-Peer (P2P) Technical Specification v1.2, mailed on Dec. 14, 2011.

(Continued)

*Primary Examiner* — Maharashi Khirodhar
(74) *Attorney, Agent, or Firm* — Oppedahl Patent Law Firm LLC (57) ABSTRACT

Disclosed are a data processing method and device, the method includes: a P2P service data access is provided by using the P2P station network interface and an AP service data access is provided by using the soft AP network interface; service data are received, a network interface corresponding to a service type of the received service data is determined, a radio frequency channel corresponding to the determined network interface is determined, and the service data are transmitted by using the determined radio frequency channel.

15 Claims, 3 Drawing Sheets

(51) Int. Cl.
*H04L 29/08* (2006.01)
*H04W 84/12* (2009.01)

(56) References Cited

U.S. PATENT DOCUMENTS

| | | | | |
|---|---|---|---|---|
| 2012/0322368 | A1* | 12/2012 | Desai | H04W 76/023 455/41.1 |
| 2013/0044739 | A1* | 2/2013 | Huang | H04W 52/0216 370/338 |
| 2014/0003237 | A1* | 1/2014 | Kenney | H04W 28/10 370/235 |
| 2014/0355437 | A1* | 12/2014 | Damodaran | H04W 28/16 370/232 |

FOREIGN PATENT DOCUMENTS

| | | |
|---|---|---|
| EP | 2448356 A2 | 5/2012 |
| WO | 2011039718 A1 | 4/2011 |

OTHER PUBLICATIONS

Supplementary European Search Report in European application No. 14779398.8, mailed on Jul. 23, 2015.
International Search Report in international application No. PCT/CN2014/074675, mailed on Jun. 4, 2014.

* cited by examiner

DATA PROCESSING METHOD, DEVICE AND COMPUTER STORAGE MEDIUM

TECHNICAL FIELD

The present disclosure relates to communication techniques, and in particular to method, device and a computer storage medium for data processing.

BACKGROUND

As the rapid development of microelectronics and increasing improvement on functionality and performance of smart phones, mobile phones are gradually replacing common electronic products such as personal computers and laptop computers; in a multi-user scenario. If a user of a mobile phone is desirable to share a local file with other users, it will be complicated to use an operation by means of near field communication. For example, if sharing by using blue tooth, corresponding operations such as searching and blue tooth matching need to be performed, other related techniques provide a wireless router supporting a projection functionality so as to implement sharing by way of projecting and demonstrating a file, but a corresponding device needs to be added in a mobile phone, which increases difficulty for a user to perform operations and cannot meet the user's need of network access in a current scenario.

In related techniques, there are so far no effective solutions for implementing easily and conveniently file sharing while providing network access in a multi-user scenario.

SUMMARY

The present disclosure provide a data processing method, device and a computer storage medium so as to implement easily and conveniently file sharing while providing network access in a multi-user scenario.

The technical solutions of the embodiments of the present disclosure are implemented as follows.

Embodiments of the present disclosure provide a data processing method for use in a device having a multimedia interface and configured with a peer-to-peer (P2P) station network interface and a soft Access Point (AP) network interface, and the method includes:

a P2P service data access is provided by using the P2P station network interface and an AP service data access is provided by using the soft AP network interface;

service data are received, a network interface corresponding to a service type of received service data is determined, a radio frequency channel corresponding to the determined network interface is determined, and the service data are transmitted by using the determined radio frequency channel.

In an embodiment, the type of service data is determined according to a frame structure of the service data or a Basic Service Set identifier (BSSID) carried by the service data.

In an embodiment, when a service type corresponding to the service data is a P2P service, the method may further include:

the service data are stored, the service data are broadcasted by using a radio frequency channel corresponding to the P2P service, or access to the service data is provided by the P2P station network interface.

In an embodiment, the method may further include:

stored service data are projected by using the multimedia interface.

In an embodiment, the providing a P2P service data access by using the P2P station network interface and the providing an AP service data access by using the soft AP network interface may include:

information of the P2P station network interface is announced by way of transmitting a P2P station broadcast frame and information of the soft AP network interface is announced by way of transmitting a beacon broadcast frame.

In an embodiment, when frequency bands used by radio frequency channels corresponding to the P2P service and the soft AP service are different, the transmitting the service data by using the determined radio frequency channel may include:

the radio frequency channels corresponding to the P2P service and the soft AP service are opened alternately in a time division way and corresponding service data are transmitted within a time slice when a radio frequency channel is open.

In an embodiment, when frequency bands used by radio frequency channels corresponding to the P2P service and the soft AP service are same, the transmitting the service data by using the determined radio frequency channel may include:

corresponding time slices are allocated respectively to the P2P service and the soft AP service and service data corresponding to respective services are transmitted by using respective radio frequency channels in time slices allocated to respective services.

In an embodiment, when there are interferences between the frequency bands used by radio frequency channels corresponding to the P2P service and the soft AP service, the method may further include:

the frequency bands used by radio frequency channels corresponding to the P2P service and the soft AP service are switched.

Embodiments of the present disclosure further provide a computer storage medium, in which a computer-executable instruction is stored, wherein the computer-executable instruction is configured to implement the data processing method as described above.

Embodiments of the present disclosure further provide a data processing device having a multimedia interface and configured with a peer-to-peer (P2P) station network interface and a soft AP network interface, and the device further includes:

an access provision unit configured to provide a P2P service data access by using the P2P station network interface and providing an AP service data access by using the soft AP network interface;

a reception/transmission unit configured to receive service data and transmit the service data by using a radio frequency channel determined by a determination unit; and the determination unit configured to determine a network interface corresponding to a service type of received service data and determine a radio frequency channel corresponding to the determined network interface.

In an embodiment, the determination unit is further configured to determine the type of service data according to a frame structure of the service data or a Basic Service Set identifier (BSSID) carried by the service data.

In an embodiment, the device may further include: a storage unit configured to store the service data when a service type corresponding to the service data is a P2P service;

an access provision unit configured to broadcast the service data by using a radio frequency channel corresponding to the P2P service or provide access to the service data by the P2P station network interface.

In an embodiment, the device may further include a projection unit configured to project stored service data by using the multimedia interface.

In an embodiment, the access provision unit is further configured to announce information of the P2P station network interface by way of transmitting a P2P station broadcast frame and announce information of the soft AP network interface by way of transmitting a beacon broadcast frame.

In an embodiment, the reception/transmission unit is further configured to open alternately the radio frequency channels corresponding to the P2P service and the soft AP service in a time division way and transmit corresponding service data within a time slice when a radio frequency channel is open when frequency bands used by radio frequency channels corresponding to the P2P service and the soft AP service are different.

In an embodiment, the reception/transmission unit is further configured to allocate respectively corresponding time slices to the P2P service and the soft AP service and transmit service data corresponding to respective services by using respective radio frequency channels in time slices allocated to respective services when frequency bands used by radio frequency channels corresponding to the P2P service and the soft AP service are same.

In an embodiment, the device may further include a switching unit configured to switch the frequency bands used by radio frequency channels corresponding to the P2P service and the soft AP service.

In embodiments of the present disclosure, through providing a P2P service data access to a user terminal by using a P2P station network interface, a file uploaded by a user terminal can be received, and an AP service data access is provided by using a soft AP network interface, and a network interface corresponding to a service type of received service data is determined, when P2P service data are received, through transmitting the service data by using a radio frequency channel corresponding to the P2P station network interface, the file uploaded by the user terminal can be shared to other user terminals; through providing an AP service data access by using a soft AP network interface, uplink data transmitted by a user terminal to a network side can be received and transmitted to a device on the network side, and downlink data of the network side are received and transmitted to the user terminal, thus implementing network access of the user terminal.

DETAILED DESCRIPTION

The present disclosure will be further elaborated below in combination with the accompanying drawings and specific embodiments.

Figure 1A:
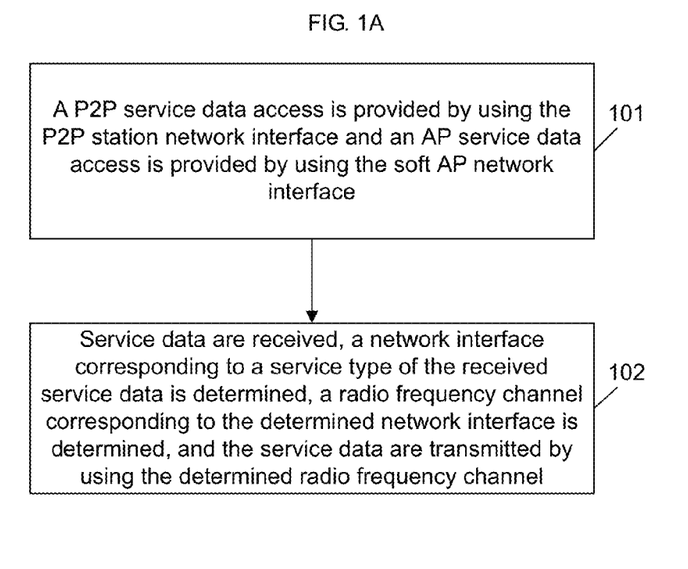
FIG. 1A is a schematic flow chart of a data processing method according to embodiments of the present disclosure.

Embodiments of the present disclosure describe a data processing method for user in a device having a multimedia interface and configured with a peer-to-peer (P2P) station network interface and a soft AP network interface, and FIG. 1A is a schematic flow chart of a data processing method according to embodiments of the present disclosure, as shown in FIG. 1A, the method includes the following steps:

step 101, a P2P service data access is provided by using the P2P station network interface and an AP service data access is provided by using the soft AP network interface.

Step 102, service data are received, a network interface corresponding to a service type of received service data is determined, a radio frequency channel corresponding to the determined network interface is determined, and the service data are transmitted by using the determined radio frequency channel.

As an embodiment, the type of service data is determined according to a frame structure of the service data or a BSSID carried by the service data.

Specifically, a frame format of a P2P service data is different from that of a soft AP service data, the type of service data can be distinguished by parsing the frame format of service data, for example, according to whether a P2P Information Element (IE) is carried in a frame and according to an OUI Type field of the P2P IE, a version of the P2P IE is identified so as to distinguish the type of service data; for the frame format of the P2P service data, refer to standard WiFi_P2P_Technical_Specification_v1.2, and it is schematically described in below table.

TABLE 1

| Elem ID | Length | OUI | OUI Type | Attr ID | Length | Attribute Body | Attr ID | Length | Body |
|---|---|---|---|---|---|---|---|---|---|
| | | | | | | P2P Attributes | | | |

Meanings of parameters in Table 1 are specifically shown as follows.

Elem ID: Serial number used by a specific IEEE820.11 manufacturer;

Length: information regarding length of fields except Elem ID and Length;

OUI: WFA specific management unique identifier;

OUI Type: information regarding version type of P2P IE;

P2P Attributes: P2P parameters.

Wherein a BSSID carried by P2P service data is also different from a BSSID carried by soft AP service data, thus the type of service data can be determined by parsing a BSSID of the service data.

As an embodiment, when a service type corresponding to the service data is a P2P service, the method may further include: the service data are stored, the service data are broadcasted by using a radio frequency channel corresponding to the P2P service, or access to the service data is provided by the P2P station network interface.

Wherein when access to the service data is provided, a device requesting for the service data is also authenticated to ensure data security.

In an embodiment, stored service data are projected by using the multimedia interface. In this way, when service data are a shared file uploaded by a device, a demonstration of the file can be implemented.

As an embodiment, the providing a P2P service data access by using the P2P station network interface and the providing an AP service data access by using the soft AP network interface may include:

information of the P2P station network interface is announced by way of transmitting a P2P station broadcast frame and information of the soft AP network interface is announced by way of transmitting a beacon broadcast frame.

As an embodiment, when frequency bands used by radio frequency channels corresponding to the P2P service and the soft AP service are different, the transmitting the service data by using the determined radio frequency channel may include:

the radio frequency channels corresponding to the P2P service and the soft AP service are opened alternately in a time division way and corresponding service data are transmitted within a time slice when a radio frequency channel is open.

For example, when a radio frequency channel corresponding to a P2P service uses a frequency band of 2.4 GHz and a radio frequency channel corresponding to a soft AP service uses a frequency band of 5 GHz, due to exclusivity of CPU, one of the two radio frequency channel can be opened while the other is closed, when opening duration is on the order of milliseconds, the objective of transmitting simultaneously service data corresponding to a P2P service and a soft AP service can be achieved.

Figure 1B:
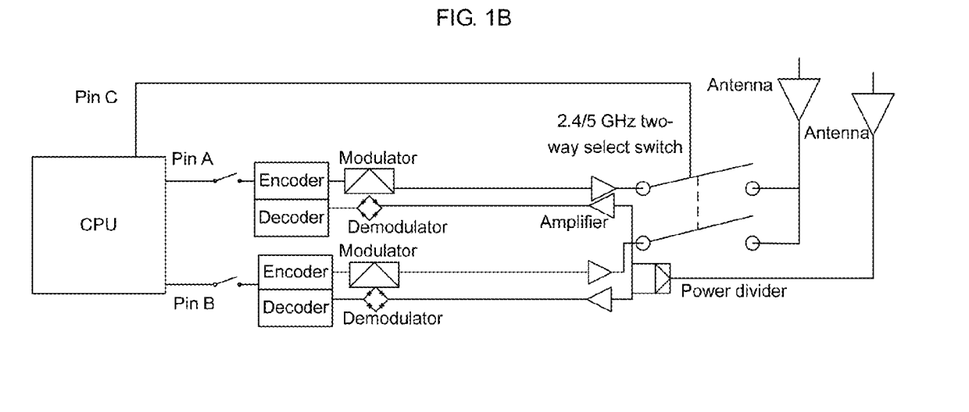
FIG. 1B is a schematic diagram of a radio frequency channel according to embodiments of the present disclosure.

FIG. 1B is a schematic diagram of a radio frequency channel according to embodiments of the present disclosure, as shown in FIG. 1B, pin A controls the opening and closing of a 2.4 GHz radio frequency channel, pulling down pin A will close the 2.4 GHz radio frequency channel, while pulling up pin A will open the 2.4 GHz radio frequency channel, then demodulation and decoding operations are performed on signals on the 2.4 GHz radio frequency channel; pulling down pin B will close a 5 GHz radio frequency channel, while pulling up pin B will open the 5 GHz radio frequency channel; the reception antennas of 2.4 GHz and 5 GHz signals are connected through a power divider so as to ensure 2.4 GHz and 5 GHz signals can be simultaneously received through an antenna, received signals can be transmitted to a corresponding demodulator and decoder for demodulation and decoding: Power Amplifier (PAs) of 2.4 GHz and 5 GHz signals are connected through a 2.4/5 GHz two-way select switch, due to the exclusivity of a CPU, when signals are transmitted, it only need to ensure that signals of one frequency band can be normally transmitted, and the two-way select switch is controlled by pin C of the CPU.

Figure 1C:
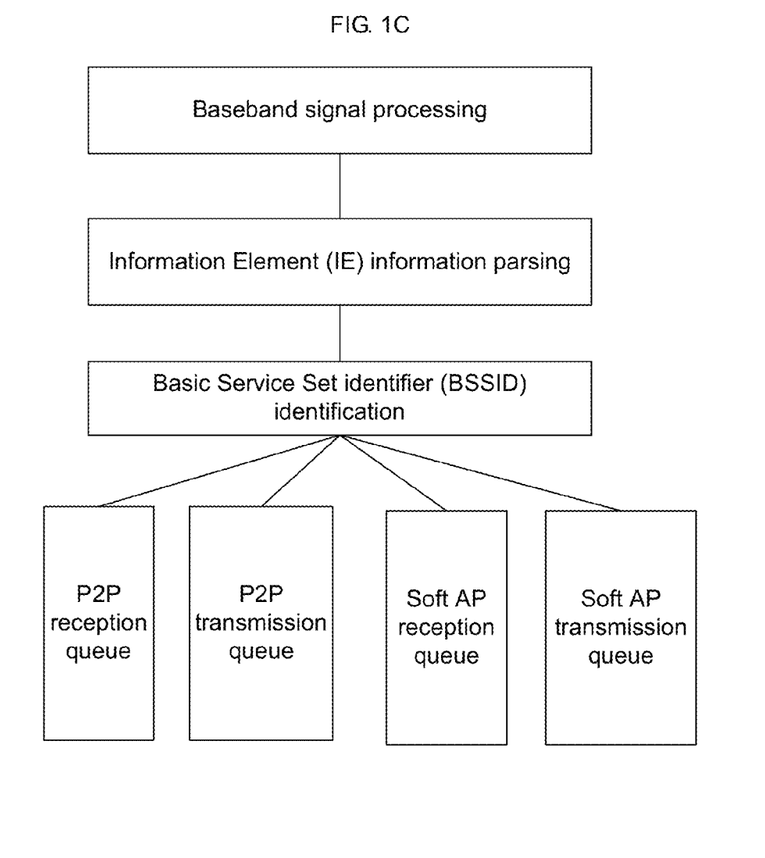
FIG. 1C is a schematic diagram of a reception and transmission queue of service data according to embodiments of the present disclosure.

Since service data corresponding to a P2P service are usually encrypted in a fixed encryption way, and a password will be updated automatically and periodically, while a password of service data corresponding to a soft AP service can be set manually by a user and the password will not be updated automatically, therefore decryption processing is performed on different types of service data. FIG. 1C is a schematic diagram of a reception and transmission queue of service data according to embodiments of the present disclosure, as shown in FIG. 1C, four queues process respectively the transmission and reception of P2P service data (including service instructions) and soft AP service data (including service instructions), base band digital signals are demodulated and then IE information parsing are performed, i.e., parsing a frame structure of service data and identification of BSSID, then different types of service data are distinguished and delivered to corresponding processing queues.

As an embodiment, when frequency bands used by radio frequency channels corresponding to the P2P service and the soft AP service are same, the transmitting the service data by using the determined radio frequency channel may include: corresponding time slices are allocated respectively to the P2P service and the soft AP service, and service data corresponding to respective services are transmitted by using respective radio frequency channels in time slices allocated to respective services.

As an embodiment, when there are interferences between the frequency bands used by radio frequency channels corresponding to the P2P service and the soft AP service, the method may further include: the frequency bands used by radio frequency channels corresponding to the P2P service and the soft AP service can be switched.

For example, when a frequency band of 2.4 GHz is used, since this frequency band carries too much services and are easily interfered, the frequency band used by the device can be switched to 5 GHz.

Embodiments of the present disclosure further describe a data processing device having a multimedia interface and configured with a P2P station network interface and a soft AP network interface;

the device is configured to: provide a P2P service data access by using the P2P station network interface and provide an AP service data access by using the soft AP network interface;

receive service data, determine a network interface corresponding to a service type of received service data, determine a radio frequency channel corresponding to the determined network interface, and transmit the service data by using the determined radio frequency channel.

In an embodiment, the type of service data is determined according to a frame structure of the service data or a BSSID carried by the service data.

In an embodiment, the device is further configured to, when a service type corresponding to the service data is a P2P service, store the service data, broadcast the service data by using a radio frequency channel corresponding to the P2P service, or provide access to the service data by the P2P station network interface.

In an embodiment, the device is further configured to project stored service data by using the multimedia interface.

In an embodiment, the device is further configured to announce information of the P2P station network interface by way of transmitting a P2P station broadcast frame and announce information of the soft AP network interface by way of transmitting a beacon broadcast frame.

In an embodiment, the device is further configured to open alternately the radio frequency channels corresponding to the P2P service and the soft AP service in a time division way and transmit corresponding service data within a time slice when a radio frequency channel is open.

In an embodiment, the device is further configured to allocate respectively corresponding time slices to the P2P service and the soft AP service and transmit service data corresponding to respective services by using respective radio frequency channels in time slices allocated to respective services.

In an embodiment, the device is further configured to, when there are interferences between the frequency bands used by radio frequency channels corresponding to the P2P service and the soft AP service, switch the frequency bands used by radio frequency channels corresponding to the P2P service and the soft AP service.

Embodiments of the present disclosure further describe a computer storage medium, in which a computer-executable instruction is stored, wherein the computer-executable instruction is configured to implement the data processing method as shown in FIG. 1A.

Figure 2:
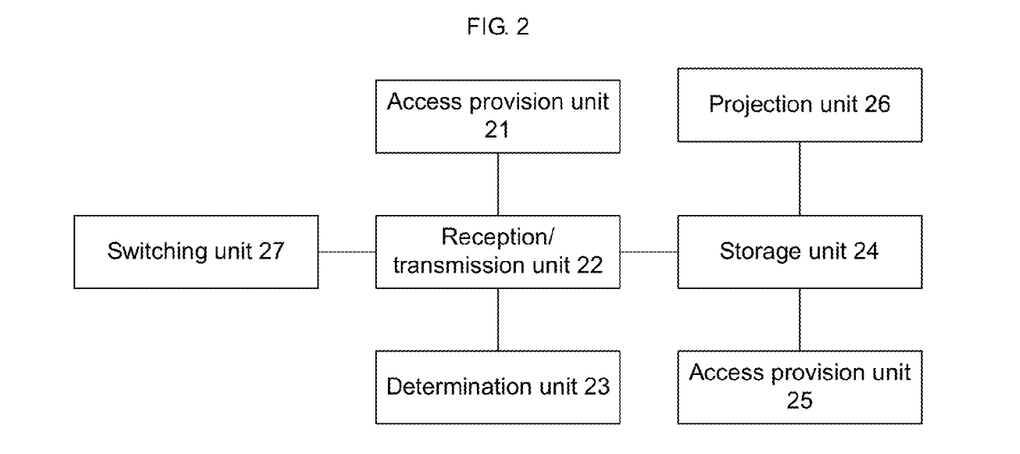
FIG. 2 is a schematic structural diagram of a data processing device according to embodiments of the present disclosure.

FIG. 2 is a schematic structural diagram of a data processing device according to embodiments of the present disclosure, as shown in FIG. 2, the device includes:

an access provision unit 21 configured to provide a P2P service data access by using the P2P station network interface and providing an AP service data access by using the soft AP network interface;

a reception/transmission unit 22 configured to receive service data and transmit the service data by using a radio frequency channel determined by a determination unit; and the determination unit 23 configured to determine a network interface corresponding to a service type of received service data and determine a radio frequency channel corresponding to the determined network interface.

In an embodiment, the determination unit 23 may be further configured to determine the type of service data according to a frame structure of the service data or a BSSID carried by the service data.

In an embodiment, the device may further include: a storage unit 24 configured to store the service data when a service type corresponding to the service data is a P2P service; and an access provision unit 25 configured to broadcast the service data by using a radio frequency channel corresponding to the P2P service or provide access to the service data by the P2P station network interface.

In an embodiment, the device may further include a projection unit 26 configured to project stored service data by using the multimedia interface.

In an embodiment, the access provision unit 21 may be further configured to announce information of the P2P station network interface by way of transmitting a P2P station broadcast frame and announce information of the soft AP network interface by way of transmitting a beacon broadcast frame.

In an embodiment, the reception/transmission unit 22 may be further configured to open alternately the radio frequency channels corresponding to the P2P service and the soft AP service in a time division way and transmit corresponding service data within a time slice when a radio frequency channel is open when frequency bands used by radio frequency channels corresponding to the P2P service and the soft AP service are different.

In an embodiment, the reception/transmission unit 22 may be further configured to allocate respectively corresponding time slices to the P2P service and the soft AP service and transmit service data corresponding to respective services by using respective radio frequency channels in time slices allocated to respective services when frequency bands used by radio frequency channels corresponding to the P2P service and the soft AP service are same.

In an embodiment, the device may further include a switching unit 27 configured to switch the frequency bands used by radio frequency channels corresponding to the P2P service and the soft AP service.

In practical applications, the access provision unit 21, the determination unit 23, the access provision unit 25 and the switching unit 27 can all be implemented by a Central Processing Unit (CPU), a Digital Signal Processor (DSP) or a Field Programmable Gate Array (FPGA) in the data processing device;

the reception/transmission unit 22 can be implemented by a receiver and a transmitter in the data processing device;

the storage unit 24 can be implemented by a non-volatile storage medium in the data processing device; and the projection unit 26 can be implemented by a projector in the data processing device.

Taking the sharing of multimedia data by the data processing device as an example, the data processing method described by embodiments of the present disclosure will be further elaborated below.

Figure 3:
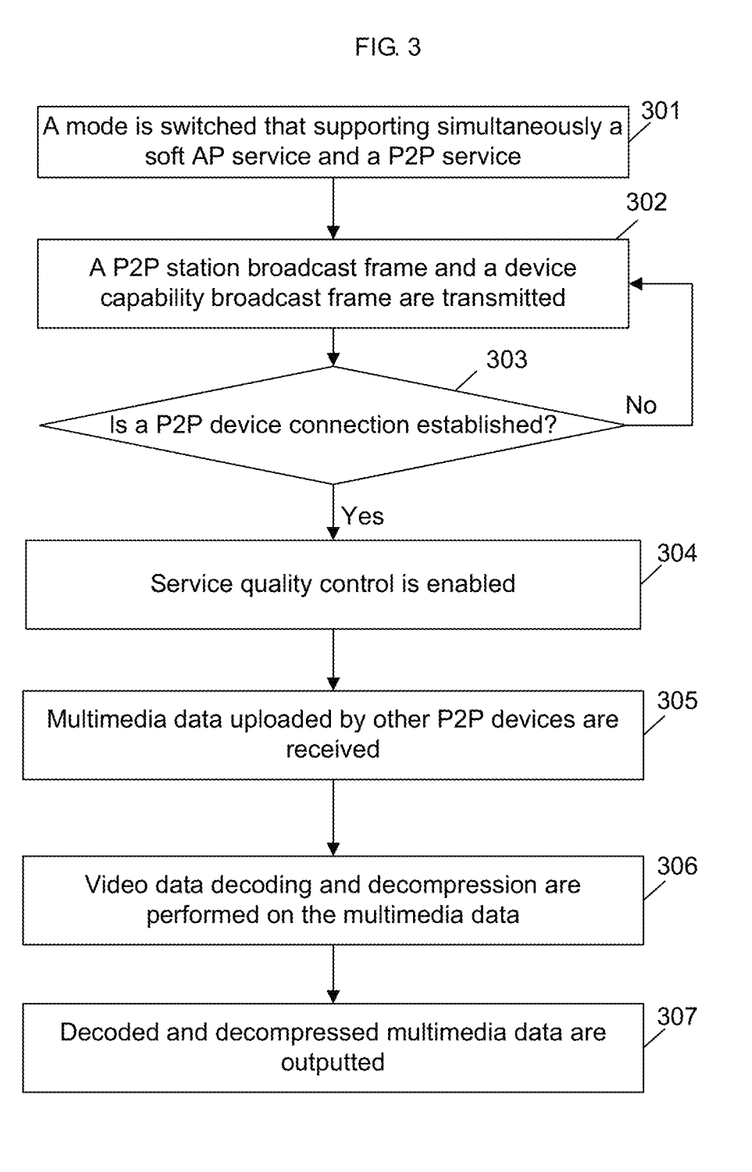
FIG. 3 is a schematic flow chart of data processing according to embodiments of the present disclosure.

FIG. 3 is a schematic flow chart of a data processing method according to embodiments of the present disclosure, as shown in FIG. 3, the method includes:

Step 301, the data processing device switches to a mode supporting simultaneously a soft AP service and a P2P service.

That is to say, both a P2P station network interface and a soft AP network interface are enabled.

Step 302, the device transmits a P2P station broadcast frame and a device capability broadcast frame.

The message is used to detect and find other P2P devices.

Accordingly, in step 302, a beacon broadcast frame can further be transmitted to detect a device requesting to access the soft AP and a soft AP service data access is provided through the soft AP network interface; when received service data of the soft AP type include uplink data from a user and downlink data from a network side, the received data of that service type are transmitted to the network side or a device accessing the soft AP through a corresponding radio frequency channel.

Step 303, it is detected whether a P2P device connection is established, if Yes, proceed to step 304; otherwise, proceed to step 302.

Step 304, the device enables service quality control so as to control transmission quality of multimedia data, and step 304 may not be implemented.

Step 305, multimedia data uploaded by other P2P devices are received.

The multimedia data uploaded by other P2P devices are received by using a radio frequency channel corresponding to the P2P station network interface and received data are stored locally.

Step 306, video data decoding and decompression are performed on the multimedia data.

Step 307, decoded and decompressed multimedia data are outputted.

In embodiments of the present disclosure, through providing a P2P service data access to a user terminal by using a P2P station network interface, a file uploaded by a user terminal can be received, and an AP service data access is provided by using a soft AP network interface, and a network interface corresponding to a service type of received service data is determined, when P2P service data are received, through transmitting the service data by using a radio frequency channel corresponding to the P2P station network interface, the file uploaded by the user terminal can be shared to other user terminals; through providing an AP service data access by using a soft AP network interface, uplink data transmitted by a user terminal to a network side can be received and transmitted to a device on the network side, and data returned by the network side are received and transmitted to the user terminal, thus implementing network access of the user terminal.

It should be appreciated by those skilled in the art that embodiments of the present disclosure can be provided as a method, system or computer program product. Therefore, the present disclosure can be in the form of a hardware embodiment, a software embodiment or an embodiment combining both hardware and software. In addition, the present disclosure can be in the form of a computer program product implemented on one or more computer usable storage media (including but not limiting to a magnetic disk storage and an optical storage) containing computer usable program codes.

The present disclosure is described with reference to flow charts and/or block diagrams of the method, device (system) and computer program product according to embodiments of the present disclosure. It should be appreciated that computer program instructions can be used to implement each process and/or block in flow charts and/or block diagrams and to implement the combination of processes and/or blocks in the flow charts and/or the block diagrams. Such computer program instructions can be provided to a processor of a general-purpose computer, a special-purpose computer, a embedded processor or other programmable data processing device so as to form a machine so that an instruction implemented by the processor of the computer or other programmable data processing device generates a device for implementing a function specified in one or more processes of a flow chart and/or one or more blocks of a block diagram.

Such computer program instructions can also be stored in a computer readable storage capable of directing a computer or other programmable data processing devices to operate in a specific way so that an instruction stored in the computer readable storage generates an artifact including an instructing device which can implement a function specified in one or more processes of a flow chart and/or one or more blocks of a block diagram.

Such computer program instructions can also be loaded onto a computer or other programmable data processing device so that a series of operation steps are implemented on the computer or other programmable data processing device to generate a computer-implemented processing and therefore an instruction implemented on the computer or other programmable devices provides a step for implementing a function specified in one or more processes of a flow chart and/or one or more blocks of a block diagram.

What described above are merely embodiments of the present disclosure, it should be noted that some improvements and modifications can be made by those skilled in the art without departing from the principles of the embodiments of the present disclosure, and the improvements and modifications fall into the scope of protection of the present disclosure.

The invention claimed is:

1. A data processing method, applicable in a device having a multimedia interface and configured with a peer-to-peer (P2P) station network interface and a soft Access Point (AP) network interface, comprising:
   providing a P2P service data access by using the P2P station network interface and providing an AP service data access by using the soft AP network interface;
   receiving service data, determining a network interface corresponding to a service type of the received service data, determining a radio frequency channel corresponding to the determined network interface, and transmitting the service data by using the determined radio frequency channel;
   wherein the step of providing a P2P service data access by using the P2P station network interface and the step of providing an AP service data access by using the soft AP network interface comprise:
   announcing information of the P2P station network interface by way of transmitting a P2P station broadcast frame to detect and find other P2P devices; and
   announcing information of the soft AP network interface by way of transmitting a beacon broadcast frame to detect a device requesting to access a soft AP; wherein the soft AP network interface is for providing network access to the device.

2. The method according to claim 1, wherein the type of service data is determined according to a frame structure of the service data or a Basic Service Set identifier (BSSID) carried by the service data.

3. The method according to claim 1, further comprising when a service type corresponding to the service data is a P2P service,
   storing the service data, broadcasting the service data by using a radio frequency channel corresponding to the P2P service, or providing access to the service data by the P2P station network interface.

4. The method according to claim 3, further comprising:
   projecting the stored service data by using the multimedia interface.

5. The method according to claim 1, wherein when frequency bands used by radio frequency channels corresponding to the P2P service and the soft AP service are different, the step of transmitting the service data by using the determined radio frequency channel comprises:
   opening alternately the radio frequency channels corresponding to the P2P service and the soft AP service in a time division way, and transmitting corresponding service data within a time slice when a radio frequency channel is open.

6. The method according to claim 1, wherein when frequency bands used by radio frequency channels corresponding to the P2P service and the soft AP service are same, the transmitting the service data by using the determined radio frequency channel comprises:
   allocating respectively corresponding time slices to the P2P service and to the soft AP service, and transmitting service data corresponding to respective services by using respective radio frequency channels in time slices allocated to respective services.

7. The method according to claim 6, further comprising when there are interferences between the frequency bands used by radio frequency channels corresponding to the P2P service and the soft AP service,
   switching the frequency bands used by radio frequency channels corresponding to the P2P service and the soft AP service.

8. A data processing device, which has a multimedia interface and is configured with a peer-to-peer (P2P) station network interface and a soft AP network interface, comprising:
   a memory storing instructions; and
   a processor coupled to the memory executing the instructions;
   the processor is configured to provide a P2P service data access by using the P2P station network interface and providing an AP service data access by using the soft AP network interface;
   receive service data and transmit the service data by using a radio frequency channel determined by a determination unit; and
   determine a network interface corresponding to a service type of received service data and determine a radio frequency channel corresponding to the determined network interface;
   announce information of the P2P station network interface by way of transmitting a P2P station broadcast frame to detect and find other P2P devices; and
   announce information of the soft AP network interface by way of transmitting a beacon broadcast frame to detect a device requesting to access a soft AP; wherein the soft AP network interface is for providing network access to the device.

9. The device according to claim 8, wherein the processor is further configured to determine the type of service data according to a frame structure of the service data or a Basic Service Set identifier (BSSID) carried by the service data.

10. The device according to claim 8, further comprising: the memory is configured to store the service data when a service type corresponding to the service data is a P2P service;
the processor is configured to broadcast the service data by using a radio frequency channel corresponding to the P2P service or provide access to the service data by the P2P station network interface.

11. The device according to claim 8, further comprising: the processor is configured to project stored service data by using the multimedia interface.

12. The device according to claim 8, wherein the processor is further configured to open alternately the radio frequency channels corresponding to the P2P service and the soft AP service in a time division way and transmit corresponding service data within a time slice when a radio frequency channel is open when frequency bands used by radio frequency channels corresponding to the P2P service and the soft AP service are different.

13. The device according to claim 8, wherein the processor is configured to allocate respectively corresponding time slices to the P2P service and to the soft AP service and transmit service data corresponding to respective services by using respective radio frequency channels in time slices allocated to respective services when frequency bands used by radio frequency channels corresponding to the P2P service and to the soft AP service are same.

14. The device according to claim 13, further comprising: the processor is configured to switch the frequency bands used by radio frequency channels corresponding to the P2P service and the soft AP service.

15. A non-transitory computer storage medium with computer-executable instructions stored thereon that, when executed by a processor, cause the processor to perform a data processing method, applicable in a device having a multimedia interface and configured with a peer-to-peer (P2P) station network interface and a soft Access Point (AP) network interface, the method comprising:
providing a P2P service data access by using the P2P station network interface and providing an AP service data access by using the soft AP network interface;
receiving service data, determining a network interface corresponding to a service type of the received service data, determining a radio frequency channel corresponding to the determined network interface, and transmitting the service data by using the determined radio frequency channel;
wherein the step of providing a P2P service data access by using the P2P station network interface and the step of providing an AP service data access by using the soft AP network interface comprise:
announcing information of the P2P station network interface by way of transmitting a P2P station broadcast frame to detect and find other P2P devices; and
announcing information of the soft AP network interface by way of transmitting a beacon broadcast frame to detect a device requesting to access a soft AP; wherein the soft AP network interface is for providing network access to the device.

* * * * *